March 2, 1971
C. W. HUMPHREY
METHOD OF PRODUCING STRONG FIRED COMPACTS FROM IRON OR IRON OXIDE CONTAINING MATERIAL
Filed Oct. 20, 1969
3,567,811
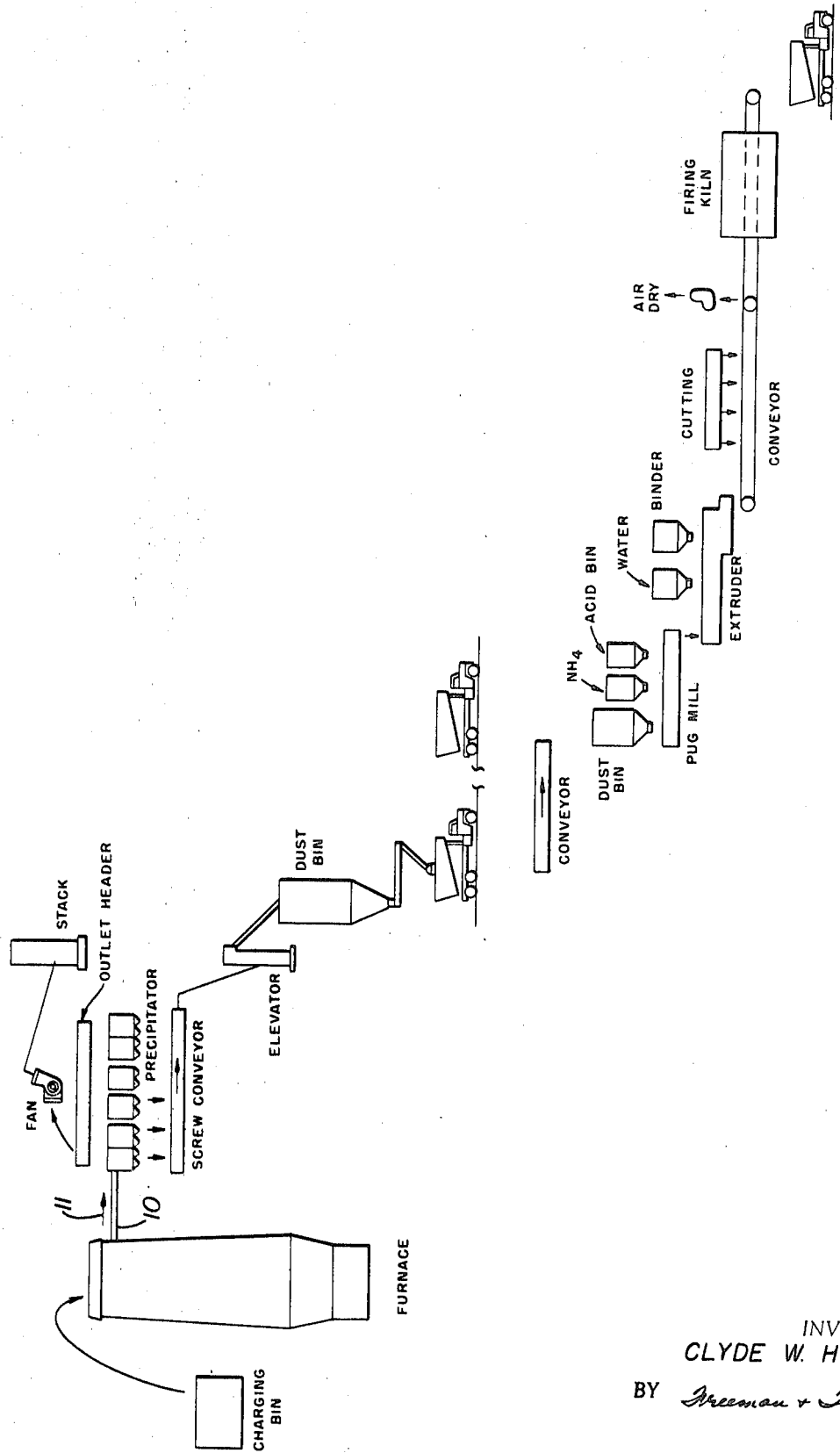
INVENTOR.
CLYDE W. HUMPHREY
BY
ATTORNEYS 大
United States Patent Office 3,567,811
Patented Mar. 2, 1971

3,567,811
METHOD OF PRODUCING STRONG FIRED COMPACTS FROM IRON OR IRON OXIDE CONTAINING MATERIAL
Clyde W. Humphrey, 1 N. Old State Road,
Norwalk, Ohio 44857
Continuation-in-part of application Ser. No. 756,694, May 9, 1968, which is a continuation-in-part of application Ser. No. 443,523, Mar. 29, 1965. This application Oct. 20, 1969, Ser. No. 871,473
Int. Cl. C21b *1/08, 1/10, 1/30*
U.S. Cl. 264—63
16 Claims

ABSTRACT OF THE DISCLOSURE

Iron or iron oxide fines such as BOF dust, iron ore, and mill scale are formed into strong ceramic bonded compacts suitable as raw material feed for steel making operations, e.g. blast furnace feed. A novel combination of additives, ammonium hydroxide, a mineral acid such as hydrochloric acid, a carbohydrate binder such as molasses, and water, provide the necessary low temperature strength until a ceramic bond is established. The compacts are formed from the cohesive mass, preferably by extrusion, dried and fired in a conventional manner.

---

This application is a continuation-in-part of my application Ser. No. 756,694, filed May 9, 1968, which application was a continuation-in-part of my application Ser. No. 443,523, filed Mar. 29, 1965.

This invention relates to methods and apparatus for binding or agglomerating materials together to produce a cohesive product. More particularly, the invention relates to the production of compacted products such as metallurgical pellets, and the like.

In manufacturing procedures of various types, there is oftentimes produced as a by-product, certain "fines" in the form of extremely small particles normally being below 200 mesh in size.

The particular invention herein made has discovered that these "fines," notwithstanding the fact that the same are of different substance, can be successfully agglomerated into a cohesive compacted product that is capable of reuse as a commercial product.

For example, and considering the manufacture of steel by various methods, there is usually produced, as a by-product from the furnaces, certain gases which are admixed with, among other things, a fine flue dust. The particles of dust vary in size up to ¼ inch in diameter.

For example, in the melting process of making steel wherein oxygen is used as a reduction agent, a fine particle iron oxide is produced, which particle is carried with the waste gas into the usual precipitator for subsequent separation and entrapment within a storage bin. Such material is known in the industry as basic oxide furnace dust, or BOF dust, for short.

It is usually the present practice to truck the separated dust in enclosed vehicles to a site where the dust can be disposed of. Since the dust is of a fine, powdery nature, it is usually buried in the ground to prevent its being blown around by the wind, etc.

It is known that BOF dust and the like contain a high percentage of iron oxide. In some cases it may be as high as 75%. Many attempts have been tried to utilize the dust in steel making operations. On the whole, these attempts have been generally unsuccessful, because of the problem of properly compacting the fine dust which is difficult to handle. In addition, no suitable binder for the dust had been heretofore known that could be successfully used in briquetting and pelletizing operations through the final operation of firing.

In this regard, prior efforts to produce a usable compacted dust have been unsuccessful because the compacted mass invariably would prematurely disintegrate in the hot furnace and immediately return to the dust state, so as to be carried out of the furnace with the hot gases.

Accordingly, no advantage was gained in the overall operation.

In accordance with this invention, it was found that the BOF dust and the like can be solidified or compacted to a required degree of permanence by admixing the same with an organic binder capable of forming a cohesive mass. Organic binders suitable for use are the carbohydrates, including sugars, materials containing sugar, and starches. Representative compounds are glucose, maple syrup, molasses, sorghum, maltose, lactose, dextrin, etc. Generally materials usable as binders in this invention will have a high sugar content. Particularly suitable is molasses, which is defined as a syrupy mother liquor extracted from the juice of fruits, sugar cane, beet sugar, etc., and specifically including any concentrated or less sticky, aqueous solution of sugar, either fully or partially refined.

In this regard, applicants have used throughout the experiments hereinafter explained, blackstrap molasses, manufactured by National Molasses Company of Willow Grove, Pa., with this blackstrap molasses containing 50% or more total sugars, plus certain vitamins and minerals. It is a form of industrial molasses and is the remaining liquid after as much of the sugar has been removed from the cane juice as is economically possible.

Additionally, and for the purpose of increasing the penetrating power of the blackstrap molasses, the blackstrap molasses used is preferably pre-blended with a surfactant that is a wetting agent that reduces the surface tension of a liquid. When added to molasses, the surfactant enables the molasses to penetrate the fines more freely—to soak into them rather than merely to adhere to the surface. In practice, only a few ounces of surfactant are required per ton of molasses, with eight (8) fluid ounces of surfactant being used per ton of blackstrap molasses in preparing the "Liqui-Lass" molasses supplied by the aforesaid National Molasses Company of Willow Grove, Pa. The surfactant used by National Molasses Company is a mixture of polyoxyethylene and sorbose.

While this particular compound has been found to produce extremely satisfactory results, it is apparent that other wetting agents or surfactants could be employed in pre-blending of the molasses.

The solidified, compacted dust held together by the organic binder is first dried and then fired at elevated temperatures. A compacted mass is thereby obtained which will withstand disintegration until it is added to and dissolved in the molten bath of a furnace.

The compacting step is accomplished by various known means. Particularly suitable according to this invention is the use of extrusion means to obtain compacted products or pellets of the compacted dust, and will be more fully described hereinafter.

While the use of binders, per se, of the type above described produced a greatly improved product, it has been further discovered that the inclusion of certain other additives operates to improve the overall product achieved.

In this regard, it has been first found that if a basic ammonium compound is added to the dust and binder during the compacting step that certain improved results will be achieved. Specifically, it was found that the addition of an ammonium compound containing 26% ammonium hydroxide resulted in a compacted mass having a greater degree of strength, permanence and cohesiveness with it being theorized that the presence of the basic ammonium compound operates to make all of the ingredients of the dust soluble.

Further, it has been found that exposure of the admixture of dust and binder to a mineral acid serves to achieve another important result in that the acid serves to cleanse the dirt, combat and reduce the line content of the dust while additionally effectuating a purifying result that assists cohesiveness.

In this regard, in theory it is believed that the ammonium hydroxide and the chloride of the hydrochloric acid unite to form ammonium chloride, which substance is vaporized and, accordingly, is removed from the product during the heating step. This is important because zinc is an undesirable impurity and removal of such an undesirable impurity is advantageous from the standpoint of re-using the same in accordance with accepted procedures.

Hydrochloric acid, 37% strength, and also known as "commercial" hydrochloric acid, because of its commercial availability and low cost, has been found to be particularly satisfactory in this regard, although other mineral acids may be employed, such as sulfuric acid, phosphoric acid and nitric acid.

Even further uniformity of result is achieved by exposing the dust and binder admixture to the influence of water, which serves to increase the ease with which the admixture can be masticated for extrusion purposes.

With regard to the amount of water used, this, of course, will be a variable. As indicated above, the water is used for the purpose of imparting the required fluidity to the admixture for extrusion purposes. Additionally the less water that is present, the denser will be the extruded product. Best operating conditions exist in the range of 14% to 19% water content in the admixture, with it being noted that water contents ranging between 6% and 30% water, by weight, per pound of admixture have been extruded. In this regard, additional acid will be required if the water content is on the high side, and a less dense product will result, although in certain instances this will be satisfactory.

Finally treatment of the admixture as above described in the presence of a vacuum has been found to provide the improved result of removing air therefrom so as to increase compactness by the elimination of porosity. A slight reduction of moisture content has also been found to occur in the presence of such vacuum treatment.

Achievement of a production method for agglomerating fine particles into reusable charges accordingly becomes the principal object of this invention with other objects thereof becoming more apparent upon a reading of the following brief specification considered and interpreted in the light of the accompanying drawing.

In the drawing:

The figure is a schematic diagram of the apparatus employed in connection with practice of the improved invention.

Referring now to the figure, it will be first noted that a conventional furnace is illustrated schematically at the left hand portion of the view, with this furnace emitting an admixture of gas and BOF dust through conduit 10 in the direction of the arrow 11. This emitting admixture of gas and dust then enters a precipitator where separation of gas and dust occurs, with the gas being drawn upwardly through the outlet header by the fan so as to be emitted in its purified or washed form through the stack. The dust that has been separated drops onto a screw conveyor for delivery to a dust bin through the usual loading elevator shown in the figure.

Conveyor trucks of the known type may then be filled from the dust bin as illustrated schematically in the figure.

In this regard, the figure shows the truck in two different positions at this point, and it is to be understood that the figure shows an operation wherein the reclaiming of BOF dust is effectuated at a point remote from the furnace. It is believed axiomatic that such reclaiming operation could be conducted adjacent to the furnace, in which event the material from the first dust bin would merely serve as the source of supply for the extruder shown, with such dust being admixed with addition agents for binding, cleansing and other purposes prior to entry into the compacting chamber of the extruder as will now be described.

In this regard, the dust bin, ammonium hydroxide bin, and hydrochloric acid bin, are shown overlying a pug mill so as to permit the dust to be first placed in the mill, followed by addition of ammonium hydroxide and hydrochloric acid as the mixture progresses through the pug mill.

In the storage chamber of the extruder, the aforementioned admixture of dust, ammonium hydroxide and hydrochloric acid that is entering from the pug mill would be further exposed to action of the wetting agent such as water finally followed by addition of the binder as a final step prior to entry of the admixture to the vacuum forming chamber of the extruder from which the same will emit as a continuous "column."

With reference to the extruder shown, the same normally is of the type wherein a plurality of kneading knives operate within the storage chamber to fully masticate and admix the additive and dust, with the resulting admixture then passing through a vacuum chamber for the purpose of removing as much of the moisture and air contained as possible, with such operation insuring emission from the extruder of a compound having a maximum density obtainable.

The "Greyhound Extruder" produced by the Bonnot Company of Canton, Ohio, has been found to be suitably adapted for extrusion purposes in this regard.

Material emitting from the extruder in "column" form is then fed continuously onto a delivery conveyor wherein subsequent operations of cutting, air drying and firing take place. Air dryer and firing kiln are shown schematically in the figure, with cutting equipment being adaptable to cut the material into any given length while the air dryer facilitates moisture removal in the minimal time. Finally, the firing kiln serves to completely cure the material into a compacted product of practically indestructible characteristic.

Material emitting from firing kiln may be stored or delivered directly to the truck as shown in the figure with the truck then returning the same to the charging bin as shown at the left of the figure from which it may be used in the blast or other furnace as indicated by the arrow.

It is to be understood that although this invention has been described heretofore with particular emphasis with BOF dust, that other ferrous fines such as iron ore fines, steel fines, mill scale, iron ore, etc., may be compacted by various means according to this invention to obtain compacted products such as pellets, briquettes, blocks, etc.

The following examples are intended to be specific embodiments of the invention, but are not to be considered limiting in any sense. All quantities are parts by weight unless otherwise indicated.

EXAMPLE 1

Example 1 was made by taking 100 lbs. of BOF dust and admixing therewith two pounds of blackstrap molasses and three pounds of Portland cement. The above components were admixed in a batch mixture and water added until a moisture level of 16% was shown on a Cenco moisture control tester.

The admixture was then placed into a Bonnot extrusion machine with a ½" extrusion die, and being operated in normal fashion. The emitted products were then subjected to drying at approximate temperatures of 300° to 400° and were then fired in a black kiln to temperatures of 1875° F. A representative sample of the product so produced was marked Test Sample No. 1 and it was noted that the product readily disintegrated into minute particles, thereby illustrating a lack of cohesiveness between the components.

EXAMPLE 2

Test No. 2 was run identical to Test No. 1 with the exception that two pounds of 26% ammonium hydroxide were added to the solution. All of the other test conditions remained identical and the other samples showed an improved cohesiveness wherein some solid pieces were produced, however, the majority of compound produced may be called "fines" which is a small particle.

EXAMPLE 3

Test No. 3 was conducted under test conditions identical to Test No. 1, with the exception that two pounds of 37% hydrochloric acid were added to the solution before extrusion. Test Sample No. 3 was substantially similar to Test No. 2.

EXAMPLE 4

Test No. 4 was conducted with a similar 100 lb. batch of BOF dust with the dust first being placed in a vessel and 1% of ammonium hydroxide at 26% concentration being mixed therewith. Following this, 2% of muriatic acid (37% concentration) was added to the mixture just described and mixed therewith in a batch mixture. Following this, 2% of water was added, following which 2% of blackstrap molasses was added, at which time following admixture, the admixture was placed into the extruder, cut into suitable pellets, dried at 300° and fired as before. The resulting samples were characterized by being substantially all in large pieces with no fines being presented of any appreciable amount. Based on 100 parts of BOF dust, there was used in this example 1.00 part of sugar (based on the 50% sugar solids contained in the molasses), 0.26 part of ammonia ($NH_3$) and 0.74 part of hydrogen chloride (HCl).

With regard to the end product produced by Tests 1 to 4, meaningful crushing tests could not be obtained on the granulated products of Tests 1 to 3. Particle size and ready breakage prevented completion of meaningful tests. However, using conventional equipment at Herron Laboratories of Cleveland, Ohio, crushing strength tests were able to sustain a crushing strength of at least twelve hundred (1200) pounds with regard to the specimens of Test No. 4.

EXAMPLE 5

The following materials were mixed in a suitable mixing vessel:

75 pounds BOF dust
1 quart blackstrap molasses
½ pint water

The mixture was extruded, cut to suitable lengths as pellets and dried. The dried product was fired at 2300° F. for a suitable period of time. The resulting product was marked Exhibit 5.

EXAMPLE 6

In Example 6, forty pounds of BOF dust were mixed with one pint of blackstrap molasses and one quart of water, as was done in Example 5, with only the amounts being different. To this was first admixed 500 cc. of 37% hydrochloric acid and then there were added to such admixture an additional 250 cc. of 26% ammonium hydroxide. The mixture was masticated to the requisite condition, extruded, dried and fired, and the products marked Exhibit 6. Based on 100 parts of BOF dust, there was used in this example 1.95 parts of sugar (based on the 50% sugar solids contained in the molasses), 0.32 part of ammonia ($NH_3$) and 1.21 parts of hydrogen chloride (HCl).

EXAMPLE 7

The procedure of Example 6 was repeated, except that (a) sixteen fluid ounces of hydrochloric acid were added instead of the 500 cc. in Example 6, and (b) twelve fluid ounces of ammonium hydroxide, instead of 250 cc. ammonium hydroxide, added in Example 6, and three ounces, by weight, of dextrin, a sugary, gummy compound, were added. The mixture was extruded, dried and fired as before and marked Exhibit 7. Based on 100 parts of BOF dust, there was used in this example 1.95 parts of sugar (based on the 50% sugar solids contained in the molasses), 0.48 part of dextrin, 0.46 part of ammonia ($NH_3$) and 1.15 parts of hydrogen chloride (HCl).

EXAMPLE 8

The procedure of Example 7 was followed with the exception that the amount of ammonium hydroxide was increased to twenty-five fluid ounces and the amount of hydrochloric acid was increased to thirty-five fluid ounces. Based on 100 parts of BOF dust, there was used in this example 1.95 parts of sugar (based on the 50% sugar solids contained in the molasses), 0.48 part of dextrin, 0.95 part of ammonia ($NH_3$), and 2.50 parts of hydrogen chloride (HCl).

With regard to the properties of Examples 5 through 8, Example 5 had some degree of cohesiveness; however, the products of Examples 6, 7 and 8 were firmly fused together and all withstood crushing tests in excess of 1000 pounds per square inch.

Further, two specimens of Example 8 had their zinc content measured before and after firing, and it was found that by firing at 1900° F. for a period of one hour, the zinc content had been reduced from a high of 3.25% zinc to a low of 2.59% zinc following such firing. Further, it was found that when the firing temperatures of 700° F. were used, no substantial decrease appeared in the zinc content.

EXAMPLE 9

The following materials were mixed in a suitable mixing vessel:

40 pounds sand
40 pounds gravel
20 pounds hydraulic cement
21 quarts molasses
2½ quarts water The mixture was extruded, as pipe, dried and fired as in Example 1. The resulting product was considered fairly good for use as cement pipe.

EXAMPLE 10

The following materials were mixed in a suitable mixing vessel:

40 pounds sand
40 pounds gravel
24 pounds hydraulic cement
1 quart molasses
2 quarts water
12 ounces ammonium hydroxide The mixture was extruded, dried and fired as in Example 9. The resulting product was considered to be better than the product of Example 9 for use as cement pipe.

EXAMPLE 11

The following materials were mixed in a suitable mixing vessel:

35 pounds sand
35 pounds crushed block
26 pounds hydraulic cement
1½ quarts molasses
1½ quarts water
14 ounces ammonium hydroxide The mixture was extruded, dried and fired as in Example 9. The resulting product was considered to be very good for use as cement pipe.

EXAMPLE 12

The following materials were mixed in a suitable mixing vessel:

50 pounds coal dust (powder)
1½ quarts molasses
1 quart water

The mixture was extruded and dried and found to be good for fuel purposes and possessed a desired degree of strength and cohesiveness.

EXAMPLE 13

The following materials were mixed in a suitable mixing vessel:

50 pounds coal powder
1 quart molasses
1½ pints water
8 ounces ammonium hydroxide The mixture was extruded and dried, and found to be better for use than the one produced in Example 12.

While a full and complete description of the invention has been set forth in accordance with the dictates of the patent statues, it is to be understood that the invention is not intended to be limited to the specific embodiment herein shown. In the following claims, parts of materials are by weights.

What is claimed is:

1. A method of producing aggregates from iron-bearing fines selected from the group consisting of basic oxygen furnace dust, steel fines, mill scale, iron ore, including fines or mixtures thereof, that are suitable for use in steel- and iron-making furnaces consisting essentially of:
   (A) admixing with the iron-bearing fines, first, ammonium hydroxide and an acid selected from the group consisting of hydrochloric acid, sulfuric acid, phosphoric acid, nitric acid or mixtures thereof, and then a binder consisting essentially of a carbohydrate and water sufficient to give an admixture adapted to be formed into aggregates,
   (B) forming the admixture into aggregates,
   (C) heating the aggregates to remove the water and firing the aggregates to obtain firmly fused, crush-resistant aggregates suitable for use in steel- and iron-making processes.

2. The method of claim 1 wherein the binder is sugar, materials containing sugar, starch or mixtures thereof.

3. The method of claim 1 wherein a major portion of the iron-bearing fines is basic oxygen furnace dust, and a major portion of the binder is blackstrap molasses.

4. The method of claim 3 wherein the acid is hydrochloric acid.

5. The method of claim 1 wherein the fines are admixed first with the ammonium hydroxide, then with the acid, and finally with the binder and water.

6. The method of claim 5 wherein the carbohydrate binder is sugar, materials containing sugar, starch, or mixtures thereof.

7. The method of claim 5 wherein a major portion of the iron-bearing fines is basic oxygen furnace dust, a major portion of the binder is blacktrap molasses, and the acid is hydrochloric acid.

8. The method of claim 5 wherein there is used per 100 parts of iron-bearing fines, 1 to 2.43 parts of binder, ammonium hydroxide in an amount equivalent to 0.26 to 0.95 part of ammonia, and an aqueous acid in an amount equivalent to 0.74 to 2.50 parts of the anhydrous precursor of the acid.

9. The method of claim 5 wherein there is used per 100 parts of iron-bearing fines, at least 1 part of binder, ammonium hydroxide in an amount equivalent to at least 0.26 part of ammonia and an aqueous acid in an amount equivalent to at least 0.74 part of the anhydrous precursor of the acid.

10. The method of claim 8 wherein the carbohydrate binder is blackstrap molasses in an amount sufficient to provide 1 to 2.43 parts of sugar, and the aqueous acid is hydrochloric acid.

11. The method of claim 9 wherein the carbohydrate binder is blackstrap molasses in an amount sufficient to provide at least 1 part of sugar, and the aqueous acid is hydrochloric acid.

12. The method of claim 7 wherein the binder contains a wetting agent surfactant that reduces the surface tension of the binder.

13. The method of claim 12 wherein the admixture is formed into aggregates by extruding the admixture into an extrudate and thereafter cutting the extrudate into aggregates.

14. The method of claim 1 wherein the water content of the admixture of step (A) falls between 6% and 30% water by weight per pound of admixture.

15. The method of claim 1 wherein said binder consisting essentially of a carbohydrate is added in sufficient enough amount to form a cohesive mass defined by said fines and said binder.

16. The method of claim 1, wherein the pellets are formed by masticating and extruding the admixture into an extrudate and thereafter cutting the extrudate into pellets.

References Cited

UNITED STATES PATENTS

| | | | |
|---|---|---|---|
| 1,899,584 | 2/1933 | Navias | 264—63 |
| 2,277,663 | 3/1942 | Francis et al. | 75—25 |
| 2,417,493 | 3/1947 | Holz | 75—25 |
| 2,806,775 | 9/1957 | West et al. | 75—5 |
| 2,996,372 | 8/1961 | Imperato | 75—25 |
| 3,154,403 | 10/1964 | Stickley | 75—5 |
| 3,189,436 | 6/1965 | Burstlein | 75—5 |
| 3,266,887 | 8/1966 | Kramer et al. | 75—5 |
| 3,311,465 | 3/1967 | Ban et al. | 75—5 |
| 3,374,085 | 3/1968 | Stone | 75—25 |
| 3,403,018 | 9/1968 | Thom | 75—25 |

FOREIGN PATENTS

| | | | |
|---|---|---|---|
| 157,571 | | Australia | 264—63 |

JULIUS FROME, Primary Examiner

J. H. MILLER, Assistant Examiner

U.S. Cl. X.R.

75—5, 25